UNITED STATES PATENT OFFICE.

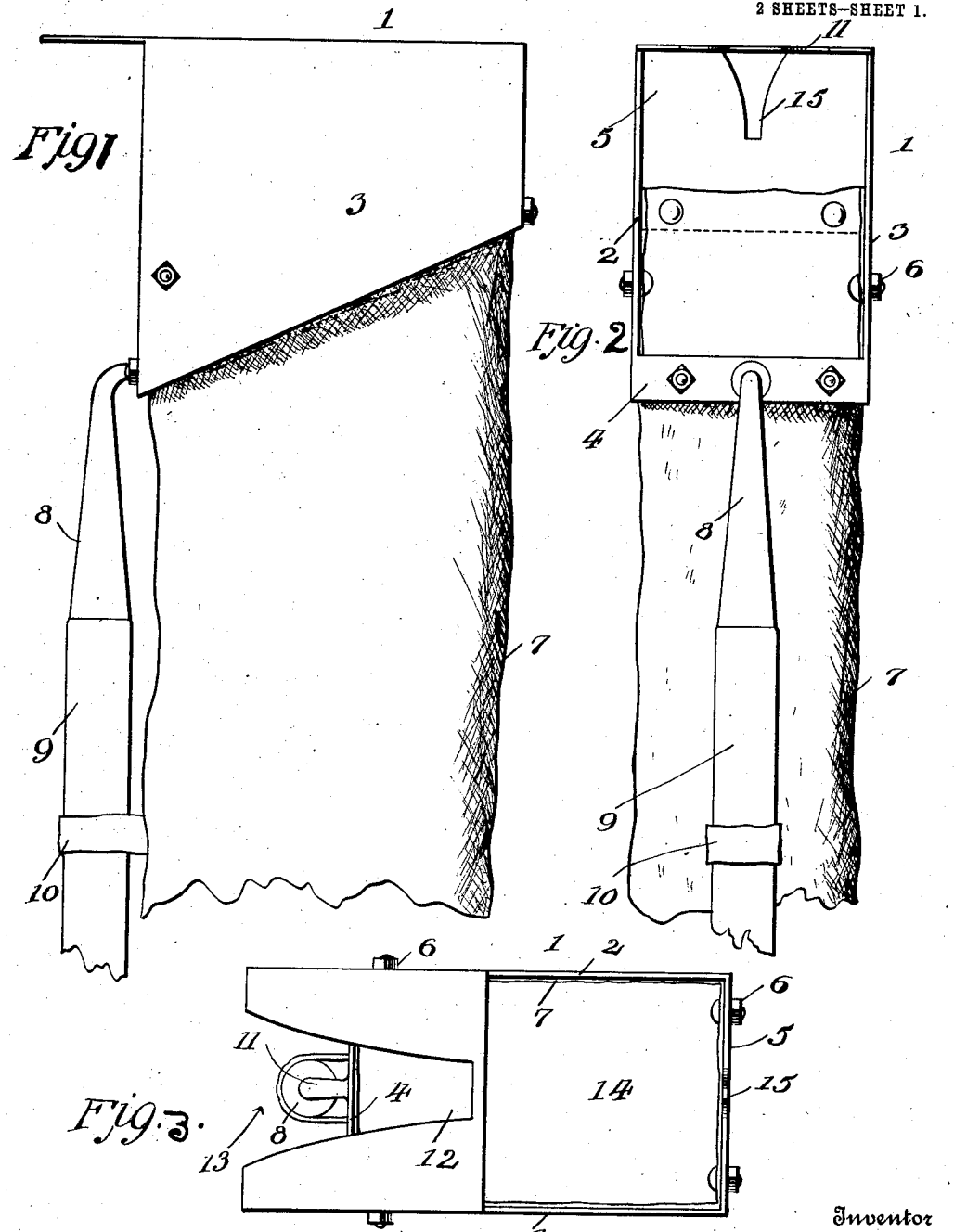
H. P. GUY.
TOOL FOR PICKING FRUIT.
APPLICATION FILED DEC. 14, 1910.
1,021,595.
Patented Mar. 26, 1912.
2 SHEETS—SHEET 1.
Witnesses
William Smith
Inventor
Hugh P. Guy.
By Victor J. Evans
Attorney

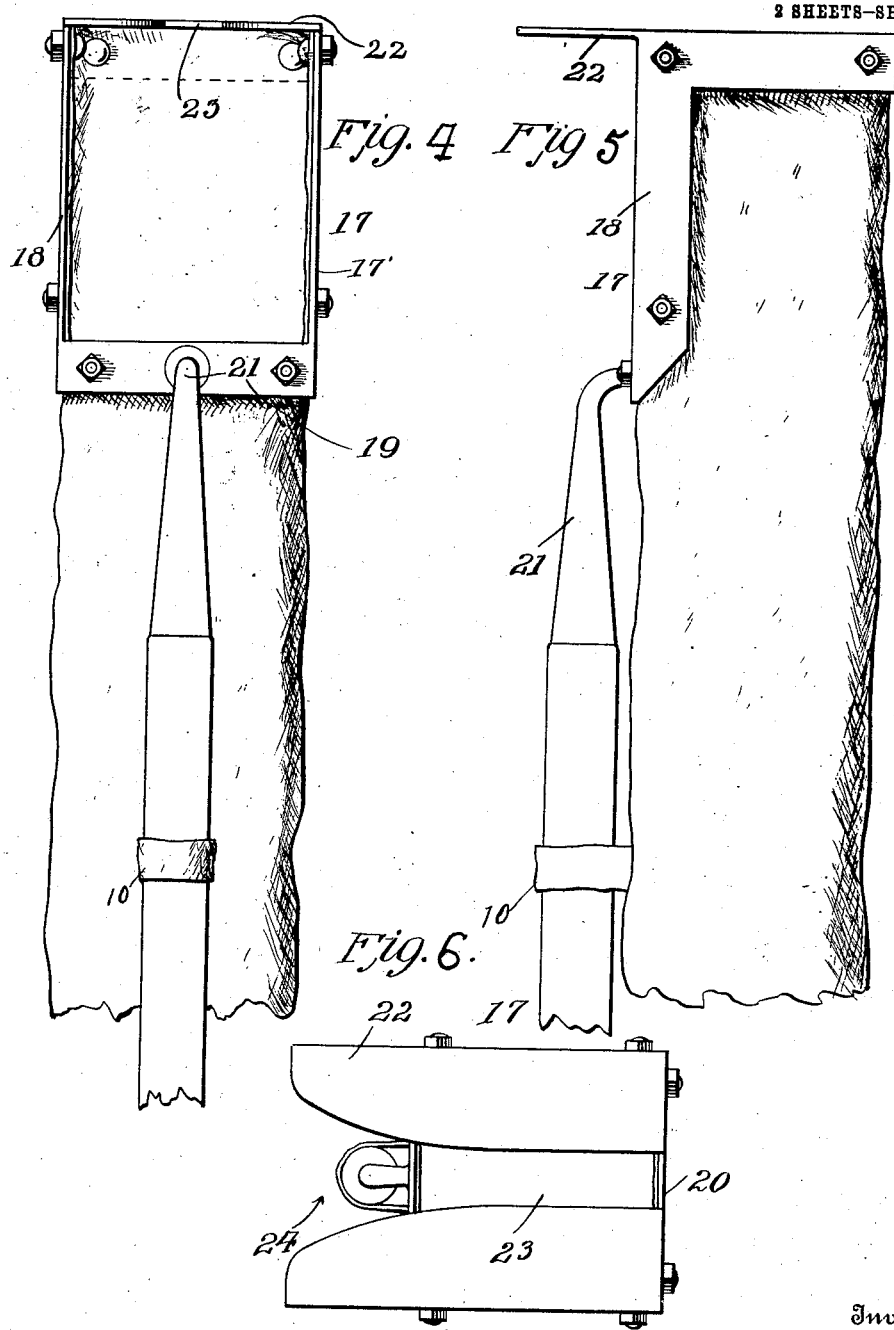

HUGH P. GUY, OF ST. LOUIS, MISSOURI.

TOOL FOR PICKING FRUIT.

1,021,595.  Specification of Letters Patent.  Patented Mar. 26, 1912.

Application filed December 14, 1910. Serial No. 597,237.

*To all whom it may concern:*

Be it known that I, HUGH P. GUY, a citizen of the United States, residing at St. Louis, in the State of Missouri, have invented new and useful Improvements in Tools for Picking Fruit, of which the following is a specification.

This invention relates to improvements in fruit picking devices and resides in the novel construction and arrangement of parts hereinafter fully described and claimed.

In the accompanying drawings, Figure 1 is a side elevation of a fruit picking device constructed in accordance with the present invention. Fig. 2 is a front elevation of the same. Fig. 3 is a top plan view of the same. Fig. 4 is a front elevation of a modified form of the device. Fig. 5 is a side elevation of a modified form of the device. Fig. 6 is a top plan view of the same.

It is the primary object of the present invention to provide a fruit gatherer which can be manipulated by the operator standing upon the ground below the tree containing the fruit to be gathered, the gatherer being of an extremely simple construction and comprising a frame 1 constructed of some suitable metal or other desirable material.

In the device illustrated in Figs. 1 to 3 inclusive, the frame comprises a pair of side members designated by the numerals 2 and 3. These members have their lower front portion connected by a strip, also preferably constructed of metal, and designated by the numeral 4. The sides of the frame have their lower portions either integrally formed with or connected with a strip 5, and the sides and connecting strips are all formed with suitable openings adapted for the reception of securing elements 6 whereby a chute 7, constructed of canvas or other suitable flexible material is attached to the frame. Formed upon or securely connected with the strip 4 is a socket 8, and this socket is adapted for the reception of a handle 9. The handle may be formed of any desired number of sections, connected together through the medium of a sleeve or collar. The chute 7 is provided with a plurality of loops 10 adapted for the reception of the handle 9 to retain the same in proper spaced relation with the chute.

The numeral 11 designates the top of the device. This top may be integrally formed with the sides or may be removably connected therewith, and the said top is adapted to project a suitable distance beyond the outer face of the frame and to have its inner edge terminate approximately central of the frame. The top 11 is centrally provided with a longitudinally extending cut-away portion 12, and the projecting portions of the said top are inclined or diverged in opposite directions so as to provide a flaring mouth 13. The edges of the top provided by the said opening 12 may be sharpened if desired so that the fruit may be readily severed when it comes in contact with the same. The space 14 between the rear wall of the top and the connecting strip 5 is of a sufficient size to accommodate the fruit to be gathered, and the said connecting strip 5 is provided with a substantially V-shaped slot or opening 15. The edges of the strip 5 provided by the slot 15 may be sharpened if desired so that the stem of a fruit may be severed from the tree containing the same by an upward movement of the gatherer. It is obvious that the cut-away portion 12 is adapted to gather fruit when the device is manipulated in a longitudinal direction and that the V-shaped opening 15 will sever the fruit from the tree when it hangs in such a position with relation to the limb that the cut-away portion 12 cannot be gotten over the fruit. With the stem in the V-shaped opening 15 an upward motion will cause the fruit to take the same course as before described.

In Figs. 4 to 6 inclusive I have illustrated a slightly modified form of the device. In these figures the numeral 17 designates the frame. This frame comprises oppositely arranged side members 17 and 18. These side members have their lower portions connected together by a strip, designated by the numeral 19. The side members 18 have their rear portions connected by a strip designated by the numeral 20, and both the sides and connecting strips are formed with suitable openings adapted for the reception of securing elements whereby the flexible chute may be attached to the frame. The connecting strip 19 is provided with a socket 21 which is adapted for the reception of a suitable handle, and the handle is provided with a plurality of loops which are secured to the chute to retain the same in proper spaced relation with the handle. The numeral 22 designates the top of the device. This top 22 may be formed integrally with the sides and rear connecting strip thereof, or if desired, the top may be formed of a separate sheet of material. This top projects a suitable distance beyond the front and open face of the frame and is provided with a centrally arranged longitudinally extending slot or opening 23, the extending portions of the top provided by the said opening 23 being flared outwardly or away from each other to provide an open mouth designated by the numeral 24. The edges of the top provided by the slot or opening 23 are preferably beveled to provide sharpened edges whereby the fruit may be readily severed and deposited within the chute.

From the above description, taken in connection with the accompanying drawings, it will be noted that I have provided an extremely simple and effective device for the purpose intended, and while I have illustrated and described the preferred embodiment of the improvement, as it now appears to me, minor details of construction, within the scope of the following claim, may be resorted to if desired.

Having thus fully described the invention, what I claim as new is:—

A fruit picker of the class described comprising a substantially rectangular frame having an open face, a handle for the frame, a chute removably connected to the frame and secured to the handle, the said frame being provided at its front end with a pair of depending side members adapted to form a face and securely retain the chute in position thereto, the said frame having its top portion projecting beyond the front face of the frame and terminating at its rear edge approximately central of the upper face, the said portion being provided with a central longitudinally extending opening having a flaring mouth, and the said frame being provided at the rear side with a substantially V-shaped opening whereby to provide a means to remove the fruit when it hangs in such a position with relation to the limb that the central longitudinally extending opening cannot be gotten over the limb.

In testimony whereof I affix my signature in presence of two witnesses.

HUGH P. GUY.

Witnesses:
J. C. MARTIN,
G. M. WARDER.

---

Copies of this patent may be obtained for five cents each, by addressing the "Commissioner of Patents, Washington, D. C."